United States Patent [19]

Aikin et al.

[11] Patent Number: 4,916,938

[45] Date of Patent: Apr. 17, 1990

[54] VALVE LEAKAGE INSPECTION, TESTING AND MAINTENANCE PROCESS

[75] Inventors: John A. Aikin; Derek Angus, both of Deep River; John W. Reinwald, Chalk River; Jack Schankula, Deep River, all of Canada

[73] Assignee: Atomic Energy of Canada Limited, Ontario, Canada

[21] Appl. No.: 262,659

[22] Filed: Oct. 26, 1988

[30] Foreign Application Priority Data

Aug. 25, 1988 [CA] Canada .................................. 575633

[51] Int. Cl.4 ............................................. G01M 3/26
[52] U.S. Cl. ................................... 73/46; 73/40; 277/2
[58] Field of Search ...................... 73/46, 40, 36, 4 R; 277/2; 376/250

[56] References Cited

U.S. PATENT DOCUMENTS

| | | | |
|---|---|---|---|
| 2,647,720 | 8/1953 | Volpin | 251/93 |
| 2,647,721 | 8/1953 | Volpin | 251/103 |
| 2,780,233 | 2/1957 | Volpin | 137/315 |
| 3,530,708 | 9/1970 | Marand | 73/455 |
| 3,872,714 | 3/1975 | Carlson, Jr. | 73/46 |
| 3,887,196 | 6/1975 | Renfrow | 277/2 |
| 3,914,752 | 10/1975 | Howard et al. | 277/2 |
| 4,026,001 | 5/1977 | Jones | 29/213 E |
| 4,149,558 | 4/1979 | McGee et al. | 137/315 |
| 4,394,872 | 7/1983 | Schobl | 137/315 |
| 4,537,407 | 8/1985 | Jansen et al. | 277/2 |
| 4,766,765 | 8/1988 | Ezekoye | 73/46 |

FOREIGN PATENT DOCUMENTS

| | | |
|---|---|---|
| 649967 | 10/1962 | Canada . |
| 951139 | 7/1974 | Canada . |
| 981192 | 1/1976 | Canada . |
| 1012954 | 6/1977 | Canada . |
| 1023727 | 10/1978 | Canada . |
| 1181577 | 1/1979 | Canada . |
| 2600420 | 6/1986 | France . |

Primary Examiner—Hezron E. Williams
Attorney, Agent, or Firm—John W. Ross

[57] ABSTRACT

A valve maintenance process is described that allows for the inspection and testing of valve stem packing and back-seat leakage. The process uses the characteristics of incompressible fluid flow to check the integrity of the valve back-seat, to allow the controlled removal of the complete packing set and to confirm the newly installed packing set is not leaking. The process is designed to reduced down-time and to improve the engineering quality of valve repair.

15 Claims, 4 Drawing Sheets

VALVE LEAKAGE INSPECTION, TESTING AND MAINTENANCE PROCESS

BACKGROUND OF THE INVENTION

This invention relates to the inspection and testing of valves for leakage, particularly valve packing leakage along the stem and/or leakage along or around that portion of the valve structure commonly known as the back seat, and to the removal of defective or worn valve packings from the valve.

A typical valve structure to which the present invention is applicable includes a valve body defining a flow passage therethrough and a movable flow control member for opening and closing said flow passage. A valve stem is connected to said member and is movable between first and second positions to effect movement of the flow control member through or between open and closed positions respectively. The valve has a stuffing box through which said stem extends and a packing in said stuffing box for engaging the stem. Gland means are provided for compressing the packing to inhibit flow of pressurized fluid outwardly along said stem from said flow passage. The stem and valve body further have co-operable sealing surfaces engageable with each other when the stem has been moved to said first position to prevent or inhibit flow of pressurized fluid outwardly of the valve and along said stuffing box between the packing and stem disposed therein. The above noted co-operable sealing surfaces are typically referred to as the "back seat" surfaces.

In the maintenance of valves, valve packing leakage along the stem due to excessive leakage past the back-seat and/or packing material requires that the packing set be periodically replaced with new material. Due to safety considerations and the complex procedure required for system and valve isolation, such as in nuclear plants, back-seat testing is not frequently done and the leakage is repaired by replacing the valve packing. In many oases the valve is dismantled to visually check the back seat only to find that it is adequate thus giving rise to great wastage of time and materials.

The present practice of valve packing testing and replacement is very labour-intensive, using hand tools such as cork screw devices, special packing picks, and/or water jets to cut or fragment the packing for withdrawal from the stuffing box. Further removal of the lantern or junk rings is very labour-intensive. These existing inspection, testing and packing removal methods are of limited value because:

1. There is a potential risk to operators arising from uncontrolled leakage of dangerous fluids during a back-seat testing program.

2. There is the potential risk of over-pressurizing the piping system when using compressible fluids to check for back-seat integrity causing packing blow-out on related valves.

3. Small hand tools are ineffective in removing hard, highly consolidated packing because penetration is difficult (e.g. asbestos-based packing under conditions of high pressure and temperature).

4. The use of small hand tools is ineffective in removing soft, stratified packing that come out in flakes or small chunks (e.g. graphite-based packings).

5. The metal scraping type tools can damage accurately machined stems or gland surfaces.

6. High maintenance costs are associated with a valve "tear-down" especially when such "tear down" is unnecessary as when visual inspection of the back-seat surfaces is deemed necessary only to find later that the back-seat is adequate and that the "tear down" time has been wasted. The planning and procurement of replacement materials, as well as high man-rem dosage accumulated in nuclear operations are further factors to consider.

7. Potential health risks to workers can arise due to airborne contaminants such as asbestos fibers.

8. Potential safety risks to the operators resulting from using high-pressure water jets to cut valve packing include the risk of splashing and the spread of contaminants.

9. The use of compressible fluid, such as bottled gas, as is sometimes used for jacking packings out of a stuffing box, is dangerous because of the risk of explosive packing release and the spread of contaminants.

10. Existing devices present great difficulty in withdrawing lantern and junk rings which can not be penetrated by hard tools or water jets. Other packing removal devices employing elongated cutters and pulverizers have similar disadvantages with limited application and long set-up times.

SUMMARY OF THE INVENTION

The present invention seeks to alleviate the Problems associated with the various prior art devices and techniques, and, in one aspect, provides an inspection process for use with valves having the structure generally as described above, such process including the steps of:

(a) moving the valve stem to the first position wherein the co-operable sealing surfaces (back-seat surfaces) are engaged with each other;

(b) flowing an incompressible liquid under pressure into the stuffing box at a location therein such as to apply liquid pressure to said co-operable sealing surfaces and to exert a hydraulic force on the packing, which force is directed outwardly of the valve along the valve stem;

(o) stopping the flow of liquid once a desired pressure has been reached and observing and/or detecting the rate of decay of pressure as well as any leakage outwardly along the stem to obtain an indication of the sealing integrity of the co-operable sealing surfaces and/or the ability of the packing to resist leakage along the stem.

In a further aspect of the invention the observed pressure is allowed to decay initially so as to substantially fill interstices in the packing and then effecting a further flow of liquid into said stuffing box until a desired pressure has again been reached following which the flow is stopped and the pressure decay is observed and/or detected together with any leakage along the valve stem to help establish the sealing integrity of the packing and/or the sealing integrity of co-operable sealing surfaces.

The invention also provides a maintenance procedure including the inspection procedure described above coupled with the steps of releasing said gland means and again applying a flow of liquid into the stuffing box at said location and at a pressure and flow volume sufficient to force the packing along the valve stem and substantially out of the stuffing box.

As a still further feature of the invention the maintenance procedure noted above further includes the steps of repacking the stuffing box and tightening said gland means and again flowing a liquid under pressure into said stuffing box and then stopping the flow and observing and/or detecting the rate of pressure decay substantially as recited in steps (b) and (c) above to again check the integrity of said sealing surfaces and the ability of the new packing to resist leakage. Again, as before, the observed pressure is allowed to decay initially to fill packing interstices and the like and then effecting a further flow of liquid into said stuffing box until a desired pressure is again reached and then stopping the flow and observing and/or detecting rate of pressure decay to obtain an indication of any leakage.

Further features of the invention will be apparent from the following description and appended claims.

BRIEF DESCRIPTION OF THE DRAWINGS

In drawings which illustrate a preferred embodiment of the invention.

DETAILED DESCRIPTION OF PREFERRED EMBODIMENT

Figure 1:
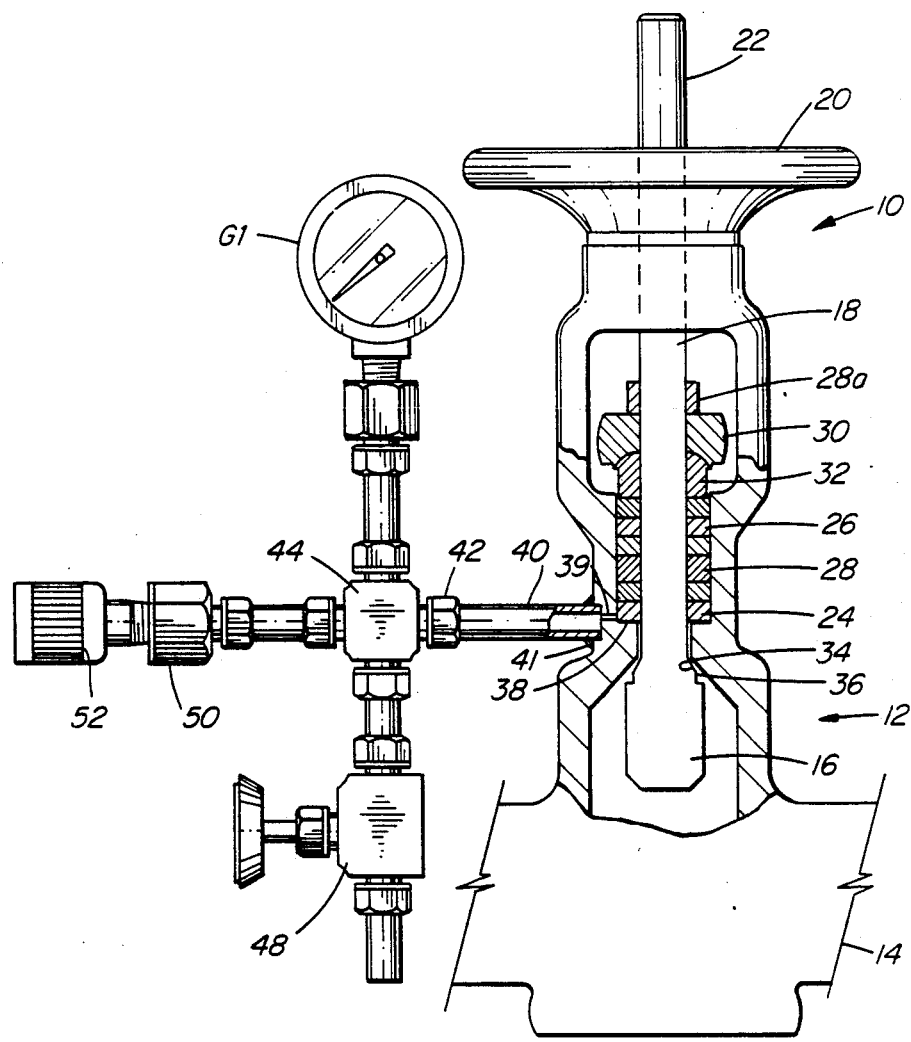
FIG. 1 illustrates a typical inspection set-up to determine valve back-seat surface integrity and valve packing quality ( i.e. its leakage characteristic)

Referring now to the drawings there is shown at FIG. 1 in a typical valve 10 having a valve body 12 defining a main flow passage 14 therethrough. A movable flow control member 16 is provided for opening and closing said flow passage in any desired or conventional manner. A valve stem 18 is connected to flow control member 16 and is movable axially through or between first and second positions in response to rotation of handwheel 20 which has internal screw threads engaged with external screw threads 22 on the upper end of stem 18 to effect movement of the flow control member 16 between open and closed positions respectively. The valve body 12 has a stuffing box 24 defined therein through which said stem 18 extends. A packing 26 in said stuffing box surrounds and tightly engages the stem. The packing comprises a plurality of pre-formed rings of asbestos or graphite-based material or other suitable material well known per se in the art. A lantern or junk ring 28 is provided for purposes well known in the art. A gland assembly including a pair of gland nuts 28a and nut, associated studs (not shown) apply force to a gland plate 30 which in turn urges a gland follower 32 against the packing 26. The gland assembly thus compresses the packing to inhibit flow of pressurized fluid within the valve outwardly along the stem from the region of the flow passage 14. The stem 18 and the valve body 12 are further provided with co-operable sealing surfaces 34, 36 engageable with each other when the stem 18 has been moved to the axially outermost first position to prevent or inhibit flow of pressurized fluid outwardly of the valve and along the stuffing box 24 and the packing and stem disposed therein. When surfaces 34, 36 are in sealing engagement with one another the valve is said to be "back-seated" and these surfaces are typically referred to as back seat surfaces.

In order to prepare the valve for procedures according to the present invention, provision must be made for access to the bottom interior of the stuffing box 24, just above the stuffing box shoulder 38. Some valve designs are initially supplied with a small inlet port in this region, in which event it is a simple matter to connect a threaded or weldable pipe nipple. However, in many cases, it is necessary to locate the shoulder 38 and to drill through the wall of the stuffing box to provide access (pilot hole 39). The shoulder can be located fairly readily by means of commercially available ultrasonic thickness testers or radiographic examination. After drilling, the high pressure nipple 40 is inserted and welded in place (weld 41), taken to comply with all codes applicable for auxiliary high pressure connections of this type. By these means, high pressure fluid applied via nipple 40 applies a hydraulic force to the packing and pressurizes the interior of the valve at this point when the back seat surfaces 34, 36 are engaged and tends to force liquid along the valve stem between the latter and the packing as well as between the back seat surfaces.

Figure 3:
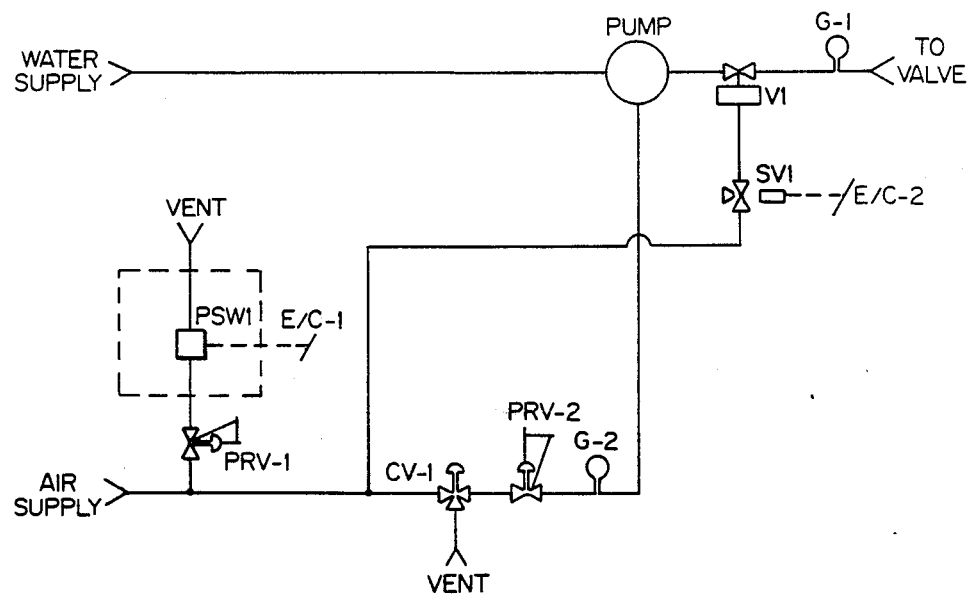
FIG. 3 is a schematic of the circuit for controlling the pump which supplies pressurized liquid during the procedure.

As seen in FIG. 1, the nipple 40 is secured via a high pressure connection 42 to a four way fitting 44, the latter, in turn, being connected by pressure fittings to a pressure gauge G1, a pressure relief valve 48, and an inlet assembly 50 including a readily detachable pressure fitting 52 which, in use, is connected to the fluid pressure supply and control system to be described hereafter with reference to FIG. 3.

With reference to the pump control system (FIG. 3), V1 is a high pressure water control valve and is activated via solenoid valve SV-1 via electrical control E/C-2. G-1 is the high pressure water gauge noted previously in FIG. 1 while G2 is an air pressure gauge associated with the pump air supply. PRV 1 & 2 are air pressure regulating valves and CV-1 is an air control valve. PSW-1 is a pressure switch under control of electrical control E/C-1.

The pump control system shown in FIG. 3, uses an explosion proof electrical circuit to operate an air-driven hydraulic pump 56. Pump 56 may, in principle, be the same or similar to that described in U.S. Pat. No. 4,473,934 to Marsac et al. The pump typically has a variable pressure range from 0 to 12,500 psi and is operator controlled by air pressure regulating valve PRV-2. 2. The pump typically operates using a 100:1 water to air pressure ratio, i.e. 80 psi air "in" = 8 000 psi water "out". The pressure range available to the operator gives considerable flexibility to the applications for which the system can be used. For example, small adjustments of PRV-2 allow the operator to control the rate of lift of the packing set from the valve stuffing box. If there is excessive leakage around the junk rings, packings or back seat surfaces, increasing the mass flow rate by increasing the pressure will often lift the packing set from the stuffing box.

The operator controls the pump operation by energizing solenoid valve SV-1 through electrical contact E/C-2. The electrical control cannot operate unless the control box is at a positive purge pressure activated by PRV-1, pressure switch PSW-1 and electrical control E/C-1 the latter components being part of an explosion-proof circuit for safety purposes.

The procedure, in general, involves the following steps:

1. With the valve stem 18 in the "back-seated" position shown in FIG. 1, the integrity of the back seat surfaces 34, 36 is checked by supplying the high pressure incompressible liquid (water) into the stuffing box via nipple 40, stopping the flow, and observing the pressure decay rate (as described hereafter) and noting any visible leakage outwardly along the valve stem 18.

Figure 2:
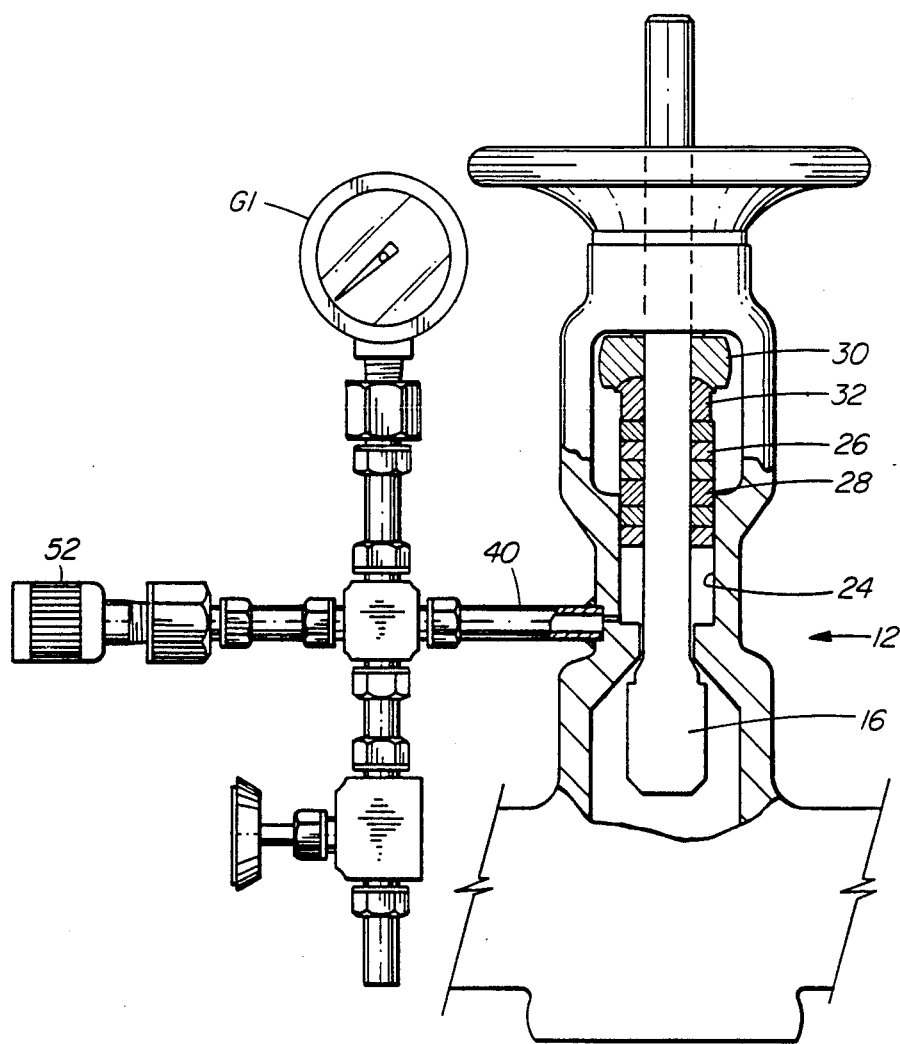
FIG. 2 is a view similar to FIG. 1 but with the packing substantially jacked or lifted out of the stuffing box.

2. The gland nuts 28a are then released and pressurized liquid is then applied to the innermost or bottom end of the stuffing box and hence to the innermost or bottom end of the packing 26 via nipple 40 at a pressure and rate as to lift or "jack" the entire packing set including packing 26 and lantern or junk rings 28 out of the stuffing box 24, reference being had to FIG. 2. The exposed packing rings are readily accessible and are cut away. (If back seat leakage is apparent, as by rapid pressure decay in step (1), it may be considered advisable to completely dismantle the valve and re-dress the sealing surfaces 34, 36 at this time).

3. After the stuffing box and stem have been inspected and the valve packings replaced, and the gland structure tightened etc., the third step of the procedure is exercised. The reassembled valve is back-seated (FIG. 1) and the pressurized liquid again applied thereby to pressurize the lower end of the stuffing box to a minimum of 1.5 times the operating pressure of the valve. The pressure decay is again observed to ensure that no significant leakage is present.

It is noted that the minimum hydrostatio test pressure of an installed system is 1.25× the lowest Design Pressure of any component within the boundary protected by an overpressure protection device. The gland loading to squeeze or compress the valve packing is generally 1.5 to 2.0× system pressure (often less than design) and is considered a low pressure component. Therefore, it is recommended that caution be taken when pressure testing the packing. If the pressure applied to the packing is too high for the gland load then packing blow-out or high packing consolidation can occur leading to excessive valve stem leakage.

A see-through containment system (not shown) may be used to restrict egress of fluid or packing material from the work area during application of the fluid pressure, such system utilizing gravity drainage or suction to remove old packing rings and debris as required. The containment system may envelop the entire valve, a portion thereof, or be restricted to application in the immediate stem area.

As can be seen, the tri-function inspection and maintenance process described above uses an incompressible fluid (e.g. water) to pressurize a small volume within the valve. Since the working fluid is essentially incompressible with very little elasticity, a small change in volume due to a leak will result in a large change in pressure. Fluid flow through an orifice for an incompressible fluid can be expressed as:

$$Q = (P_2 - P_2) \, p \times (D^4 / 128 \, ul);$$

where
$P_1$ = pressure to the stuffing box
$P_2$ = pressure at leak exit
u = visoosity of the fluid
l = length of leak path
p = density of fluid
D = orifice or equivalent diameter Since the fluid is in a cold condition and there will be little change in the fluid characteristics, the equation can be expressed as $Q = kD^4 l \times (P_1 - P_2)$ where k is a constant dependent on the fluid characteristics. Clearly, the leak rate or volume discharge is strongly related to the flow diameter D and a small change will result in a large change in the rate of pressure decay in the stuffing box. Therefore, any leakage through a bad back-seat or packing will cause the pressure in the stuffing box to drop off rapidly with time whereas a good packing or back-seat will have a much slower rate of pressure change associated with it.

Figure 4:
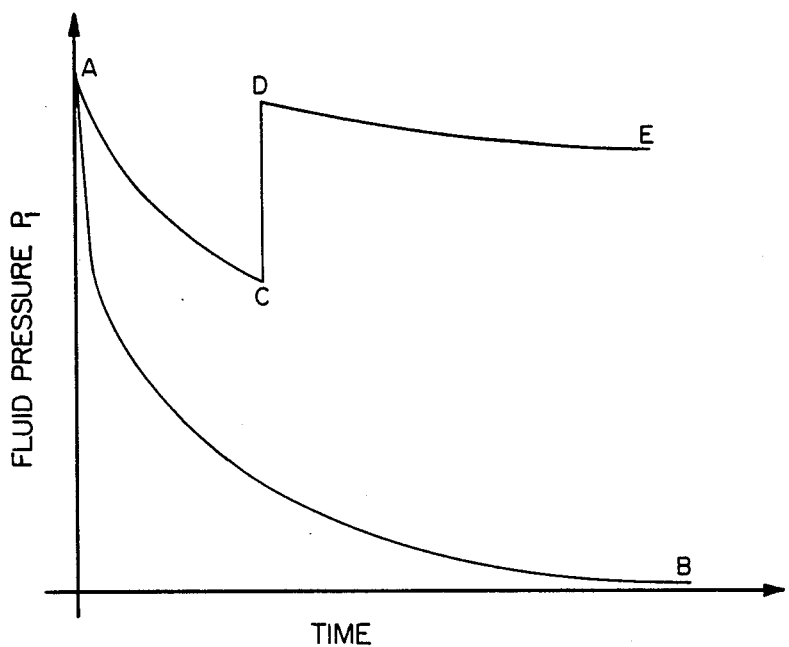
FIG. 4 shows typical pressure decay plots (pressure v time) indicating acceptable and unacceptable pressure decay characteristics.

Referring to FIG. 4, the following presents a qualitative description of the pressure decay inspection procedure. FIG. 4 is a typical pressure vs time plot that an operator might see for a given valve based on the above equation. The sharply decaying curve (A-B) would be indicative of an unacceptable back-seat where the equivalent flow diameter is large compared to the applied pressure and fluid volume. The slower change in fluid pressure at the lower pressures is due to the slower flow rate and the inherent elasticity of the packing set. Plot (ACDE) shows a pressure increase (C-D) after a certain initial period of pressure decay (A-C). In this case the back-seat is acceptable but the fluid is now filling the stuffing box cavity through the tortuous leakpath of the valve packing material. This change in volume causes the initial pressure decay (A-C). The second pressure increase (C-D) is due to the pump again being activated by the operator. Following closure of valve V1 the fluid pressure remains essential constant (D-E) indicating an acceptable back-seat and packing assembly. Typically, One can expect the decay rate for a valve having a poor back-seat or packing to be >16 times that of an acceptable valve assembly. With a little experience, an operator can readily differentiate unacceptable back-seat seals and packings from acceptable ones.

The present invention has many advantages some of which are noted below:

The disadvantages of the prior art practice of using bottled gas to lift the packing are overcome by the application of a controlled measurable flow of an incompressible fluid with no chance of explosive decompression.

The disadvantages of the prior art hand-held tools are mainly overcome using the fluid pressure jacking technique which reduces the risk of damaging the surfaces of the stem and stuffing box. Set-up time is minimal especially with the use of quick disconnect bushings. The high pressure nipple 40 need only be installed once because the same fitting can be used the next time repacking of the valve is required.

The disadvantages of the prior art water jetting technique are addressed in that the "jacking" technique of the present invention uses lower fluid pressures, less water and most of the water is contained in the stuffing box. The water jetting technology tends to require a complex set-up for each valve repacking task.

The packing and back seat seal test provided by the described invention can be performed rapidly and equipment "down time" is minimized since, among other things, disassembly of valves for visual back seat inspection is not required. Only those valves displaying poor back seat integrity need be dismantled.

We claim:

1. An inspection process for use with a valve having a valve body defining a flow passage therethrough, a movable flow control member for opening and closing said flow passage, a valve stem connected to said member and movable between first and second positions to effect movement of the flow control member through or between open and closed positions respectively, said valve having a stuffing box through which said stem extends, a packing in said stuffing box surrounding and engaging the stem, and gland means for compressing the packing to inhibit flow of pressurized fluid outwardly along said stem from said flow passage, said stem and valve body further having co-operable sealing surfaces engageable with each other when the stem has been moved to said first position to further prevent or inhibit flow of pressurized fluid outwardly of the valve and along said stuffing box between the packing and stem disposed therein; said inspection process including the steps of:

(a) moving said stem to said first position wherein said co-operable sealing surfaces are engaged with each other;

(b) flowing a substantially incompressible liquid under pressure into said stuffing box at a location therein such as to apply liquid pressure to said co-operable sealing surfaces and to exert a hydraulic force on the packing which is directed outwardly of the valve along the valve stem;

(o) stopping the flow of liquid into said stuffing box once a desired pressure has been reached and observing and/or detecting the rate of decay of pressure in said stuffing box and any leakage outwardly along the stem to obtain an indication of the sealing integrity of said co-operable sealing surfaces and/or the ability of said packing to resist leakage along the stem.

2. The process of claim 1 wherein the pressure in said stuffing box is allowed to decay initially after the stopping of the flow so as to substantially fill interstices in the packing, and then effecting a further flow of the liquid into said stuffing box until a desired pressure has again been reached following which the flow is stopped and the pressure decay is observed and/or detected together with any leakage along the valve stem to help establish the sealing integrity of the packing and/or the sealing integrity of the co-operable sealing surfaces.

3. A maintenance procedure for use with a valve having a valve body defining a flow passage therethrough, a movable flow control member for opening and closing said flow passage, a valve stem connected to said member and movable between first and second positions to effect movement of the flow control member through or between open and closed positions respectively, said valve having a stuffing box through which said stem extends, a packing in said stuffing box surrounding and engaging the stem, and gland means for compressing the packing to inhibit flow of pressurized fluid outwardly along said stem from said flow passage, said stem and valve body further having co-operable sealing surfaces engageable with each other when the stem has been moved to said first position to further prevent or inhibit flow of pressurized fluid outwardly of the valve and along said stuffing box between the packing and stem disposed therein; said maintenance procedure including the steps of:

(a) moving said stem to said first position wherein said co-operable sealing surfaces are engaged with each other;

(b) flowing a substantially incompressible liquid under pressure into said stuffing box at a location therein such as to apply liquid pressure to said co-operable sealing surfaces and to exert a hydraulic force on the packing which is directed outwardly of the valve along the valve stem;

(c) stopping the flow Of liquid Once a desired pressure has been reached and Observing and/or detecting the rate of decay of pressure and any leakage outwardly along the stem to obtain an indication of the sealing integrity of said co-operable sealing surfaces and/or the ability of said packing to resist leakage along the stem; and (d) releasing said gland means and again applying a flow of the liquid into the stuffing box at said location and at a pressure and flow volume sufficient to force the packing along the valve stem and substantially out of the stuffing box.

4. The procedure of claim 3 wherein the pressure in the stuffing box is allowed to decay initially after said stopping of the flow so as to substantially fill
   interstices in the packing, and then effecting a further flow of the liquid into said stuffing un a desired pressure has again been reached following which the flow is stopped and the pressure decay is observed and/or detected together with any leakage along the valve stem to help establish the sealing integrity of the packing and/or the sealing integrity of the co-operable sealing surfaces.

5. The maintenance procedure as recited in claim 3 further including the step of repacking the stuffing box and tightening said gland means and again flowing the liquid under pressure into said stuffing box and then stopping the flow and observing and/or detecting the rate of pressure decay to again check the inter of said sealing surfaces and/or the ability of the repacking to resist leakage.

6. The maintenance procedure as recited in claim 5 wherein the pressure in the stuffing box is allowed to decay initially after the flow is again stopped to allow for filling of packing interstices and the like and then effecting a further flow of the liquid into said stuffing box until a desired pressure is again reached and then stopping the flow and observing and/or detecting the rate of decay to obtain an indication of any leakage.

7. The process according to claim 1 wherein said valve is a rising stem valve with said stem being movable axially between said first and second positions.

8. The procedure according to claim 3 wherein said valve is a rising stem valve with said stem being movable axially between said first and second positions.

9. The procedure according to claim 4 wherein said valve is a rising stem valve with said stem being movable axially between said first and second positions.

10. The process of claim 1 wherein said flow of pressurized liquid is applied to an innermost bottom surface of said packing.

11. The procedure of claim 3 wherein said flow of pressurized liquid is applied to an innermost bottom surface of said packing so as to tend to force the entire packing by hydraulic pressure along the stem and substantially out of the stuffing box.

12. The procedure of claim 4 wherein said flow of pressurized liquid is applied to an innermost bottom surface of said packing so as to tend to force the entire packing by hydraulic pressure along the stem and substantially out of the stuffing box.

13. The process of claim 1 including the initial step of drilling a hole in said valve which leads into said stuffing box at the desired location therein to permit said flow of liquid to be introduced therein.

14. The procedure of claim 3 including the initial step of drilling a hole in said valve which leads into said stuffing box at the desired location therein to permit said flow of liquid to be introduced therein.

15. The procedure of claim 4 including the initial step of drilling a hole in said valve which leads into said stuffing box at the desired location therein to permit said flow of liquid to be introduced therein.

* * * * *